United States Patent [19] [11] 3,864,931
Guttinger [45] Feb. 11, 1975

[54] PROCESS AND APPARATUS FOR FOOD FREEZING

[75] Inventor: Manfred Guttinger, Leinfelden, Germany

[73] Assignee: Sandco Ltd., Ottawa, Canada

[22] Filed: Jan. 19, 1973

[21] Appl. No.: 325,047

[30] Foreign Application Priority Data
Jan. 19, 1972  Germany............................ 2202293

[52] U.S. Cl. ......................................... 62/63, 62/65
[51] Int. Cl. ............................................. F25d 13/06
[58] Field of Search .................. 62/63, 65, 380, 441

[56] References Cited
UNITED STATES PATENTS
1,930,414  10/1933  Buhr ...................................... 62/380
2,402,921  6/1946  Sharpe ..................................... 62/63

FOREIGN PATENTS OR APPLICATIONS
220,296  7/1942  Switzerland............................ 62/380

Primary Examiner—Meyer Perlin
Assistant Examiner—Ronald C. Capossela
Attorney, Agent, or Firm—Craig & Antonelli

[57] ABSTRACT

Process and apparatus for freezing foodstuffs, especially foodstuffs having a pulpy consistency such as sliced and soft-boiled fruits or vegetables. The foodstuffs are arranged in a thin layer on a metallic movable belt having a plurality of openings through the belt. The belt member is sequentialy moved through a first freezing zone where cooling air is directed upwardly through the openings in the belt so as to form frozen through-channels in the layer of foodstuffs and a second freezing zone where cooling air is forced against the food layer in a direction toward the support with the through-channels in the foodstuff layer providing passage means for communicating with the openings in the belt in this second zone. The velocity of the cooling air in the first zone is substantially less than the velocity of the cooling air in the second zone so as to prevent blowing of the foodstuff from the belt in the first zone and so as to facilitate rapid freezing of the foodstuff layer in the second zone. The apparatus for this process includes arranging the belt member as an endless belt extending around spaced rollers positioned outwardly of the ends of the freezing chamber containing the first and second zones. A continuous cooling or freezing medium supply circuit is provided for creating the necessary pressure differentials in the first and second zones to obtain the respective opposite flows through the foodstuffs in these two zones. Also, the second zone is provided with nozzles for increasing the velocity of flow of cooling air against the foodstuffs.

12 Claims, 4 Drawing Figures

PROCESS AND APPARATUS FOR FOOD FREEZING

BACKGROUND AND SUMMARY OF THE INVENTION

This invention relates to a process and apparatus for the freezing of foodstuffs having a pasty (pulpy) consistency, especially sliced and soft-boiled fruits or vegetables.

It is conventional to freeze foodstuffs of all kinds in order to preserve them more satisfactorily and to make them commercially available as frozen foods. The foodstuff are generally exposed to very low temperatures for this purpose, so that they are brought to below their freezing points as rapidly as possible. blanched, for example, processes are known wherein the foodstuffs are conveyed beans flat belts into refrigeration chambers obtain that the material to be frozen obtains its low temperature by heat transfer. Also, the so-called contact-cooling processes are known wherein metallic bands are, for example, sprayed with a refrigerating medium from below, so that the foods, by contact with the cold metallic band, are likewise refrigerated by heat conduction. Furthermore, for some types of foods, the practice has blanched celery, expose the goods to be cooled to a stream of cold air or the like, so that a more intense removal of the heat is possible. The disadvantage of this otherwise advantageous process resides in that not all foods can be treated in this way, since they do not permit the medium to flow through. This is the case when freezing foods of the kind mentioned hereinabove, for example when freezing vegetables, e.g., blanched cut celery, leek, cabbage sections, or parsley. Foods of this type assume a pulpy consistency due to boiling or blanching and thus are not suitable for use in a throughflow process.

When these foodstuffs are subjected to a contact-freezing procedure, there is the disadvantage that compact, frozen plates are produced, the thickness of which cannot fall below a certain value for reasons of economy. These plates must subsequently be comminuted in an expensive manner.

Finally, a method is known — generally called fluidized bed process — wherein foodstuffs or the like are suspended by means of a cold air stream directed upwardly from the support surface and are frozen and simultaneously further conveyed during this procedure. The disadvantage of this process resides in that the velocity of the upwardly directed air must be accurately adapted to the suspended condition of the solids to prevent the solids from being blown away from the freezing unit and/or from freezing to the support. Thus, the conveying speed cannot be chosen to be arbitrarily high. Besides, the fluidized bed process can only be employed if the particles of the material to be frozen have the same size and weight. Consequently, the foods of a pulpy consistency mentioned above cannot be frozen in this manner, especially when mixed vegetables are involved.

Therefore, the present invention is based on the problem of providing a process and apparatus for the freezing of such foods, operating substantially more economically then the processes known heretofore, because the heat dissipation can be accomplished more rapidly without encountering the disadvantages of the conventional process.

The invention contemplates providing that the foodstuffs are first applied in a flat layer, which latter is penetrated from below at several points by individual air jets coming from the support and having a temperature below the freezing point of the foods, so as to form solidly frozen channels or throughflow openings through the foodstuff layer; and that the food layer thus provided with throughflow openings is thereafter exposed to an intense throughflow of cold air from above the support.

This process has the advantage that the first impermeable material is aerated from below at many places and is frozen along the thus-formed throughflow channels, so that the thus-produced channels subsequently ensure the permeability of the material to be frozen. The throughflow by cold air from above can be effected at a considerable intensity, since there is no danger that the material is lifted off its support during the freezing step. Due to the high flow velocity, the heat transfer can be substantially improved, and the time required for the freezing operation can be decisively shortened. Therefore, the process of the present invention makes it possible to considerably improve the intensity of the freezing step and thus the degree of efficiency. However, at the same time, an improvement in quality is attained in some foodstuffs, for it was found that the preservability and the character and the flavor of frozen foods are at their peak when the freezing step is carried out rapidly.

For conducting the process of this invention, an apparatus proved to be particularly advantageous comprising a perforated metallic belt traveling through a freezing chamber; the foods being placed on this belt. As seen in the traveling direction of the belt, a zone is provided in the first section of the freezing chamber where superatmospheric pressure is ambient below the metallic belt, while in the subsequent section of the freezing chamber a pressure is ambient below the belt which is lower relatively to the topside of the belt. This apparatus ensures the reversal of the throughflow direction which is of decisive importance for effecting the process of the present invention.

It is advantageous to arrange chambers underneath the perforated metallic belt; the sidewalls of these chambers closely contact the bottom side of the belt. It is furthermore advantageous to arrange, underneath the metallic belt, a pressure chamber and, behind this chamber in the traveling direction of the belt, a vacuum chamber. By making the pressure in the pressure chamber adjustable, it is possible, in dependence on the respectively charged material to be frozen, to regulate the velocity of the individual jets which open up the material in such a manner that indeed only the desired aeration and formation of throughflow channels occurs, whereas the material is prevented from lifting off from the surface of the belt. Above the vacuum chamber, a hood covering the belt can be provided which is in communication with a blower or the like, which latter conveys air into the hood and from there through the material into the vacuum chamber. It is, of course, also possible to provide that a superatmospheric pressure is ambient in the hood; this makes it possible to omit the vacuum at this point underneath the belt. The essential consideration is that an intense air movement take place in the zone where the medium flows onto the material from above through the hood, so that the important factor is the pressure gradient between the topside of the belt and the bottom side of the belt. It is, of course, also contemplated by the invention to arrange the topside of the belt, i.e., the interior of the hood, and the bottom side of the belt, i.e., the vacuum chamber, within a closed cycle system wherein a vigorous pump or a blower, as well as a refrigerating unit are disposed. In this arrangement, the pressure which must be available underneath the belt upstream of the freezing chamber proper can be withdrawn from the pressure side of the cycle system.

The invention is illustrated in the drawings by means of schematic representations, to wit:

DETAILED DESCRIPTION OF THE DRAWINGS

Figure 1:
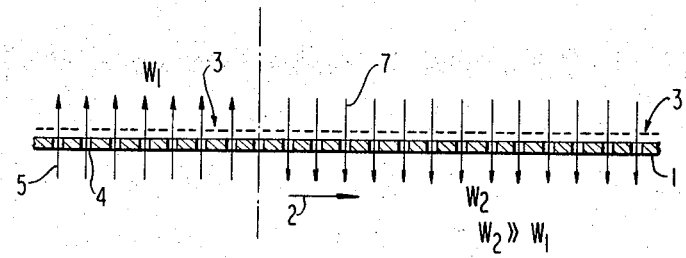
FIG. 1 is a schematic illustration of the principle features of the novel process according to the present invention.
Figure 2:
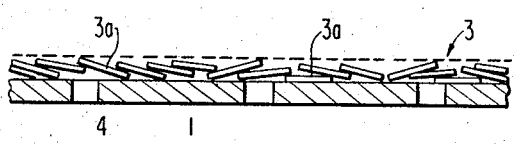
FIG. 2 is a schematic enlarged view of the first belt zone of FIG. 1.

As can be seen from FIGS. 1 and 2, a preforated metallic belt 1, moved in the direction of arrow 2, is provided for the freezing of foods having a pulpy consistency, particularly foods such as celery, leek, potatoes, or the like, which are cut into slices, and then boiled or blanced, or for foods such as, for example, peas, cherries, or beams which are boiled and thus obtain a pulpy consistency. It can be seen from FIG. 2 that the foodstuffs 3 to be frozen are disposed on the belt 1 in a relatively dense layer made up of individual foodstuff pieces 3a. These individual pieces 3a, which are shown as slices in the example, and which can consist, e.g., of cut or blancehed celerty, entirely cover the openings 4 in the perforated belt 1 such that they would exert such a resistance against the through flow of a medium from above that it would be impossible or extremely difficult for the medium to flow through the goods and through the perforated belt.

Figure 3:
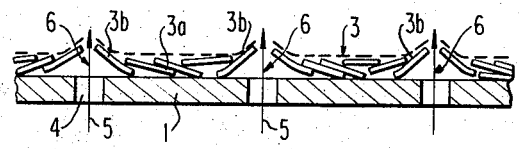
FIG. 3 is an illustration similar to FIG. 2, but in the condition wherein cold compressed air is forced from below through the material placed on the belt.

However, it can be seen from FIG. 3 that the separate pieces 3a in the layer of food 3, which are disposed directly above the openings 4, are slightly urged upwardly and thus placed into the position 3b. This is accomplished by the air jets flowing through the individual openings 4 in the belt 1 in the zone I of FIG. 1 in the upward direction, indicated by the arrows 5; these air jets have a flow velocity $W_1$ which is substantially lower than the flow velocity $W_2$ occurring in the subsequent freezing zone. The air jets penetrating the belt 1 in the direction of arrows 5 have a temperature lying below the freezing point of the food layer 3 disposed on the belt 1, so that the individual pieces of the food layer 3, lifted into the position 3b, are at least partially slightly frozen. Therefore, these pieces retain their position in the region of the air jets 5 and accordingly throughflow channels 6 are produced respectively in the zone of the openings 4, the walls of these channels being formed of the frozen and slightly lifted individual pieces 3b.

When the food material to be frozen passes, according to FIG. 1, from zone I into zone II, the layer 3 can now be subjected, due to the formed throughflow channels 6, to a throughflow from above along the arrows 7, and can thus be frozen intensively, since the air coming from above likewise has a temperature which is still further below the freezing point of the foodstuffs 3, and since the flow velocity in zone II can be chosen to be relatively high without having to contend with a lifting of the layer 3 off the belt 1. Consequently, by this flow reversal in connection with a perforated belt charged on its topside with the material to be frozen, a process is provided which makes it possible to effectively and rapidly freeze also those foods which heretofore could only be treated by contact freezing. Therefore, the freezing operation can be conducted essentially faster. Furthermore, the material is not present in the form of a fozen sheet which can be divided only with difficulties, but rather can readily be broken up into sections which approximately correspond to the size of the food pieces. This results in considerable advantages in the packaging into household-ready portions and during further processing.

Figure 4:
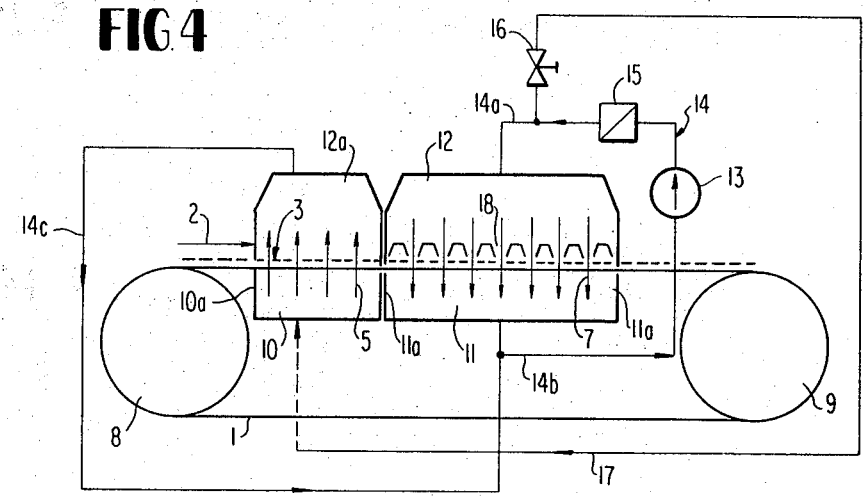
FIG. 4 is a schematic view of an apparatus for conducting the process illustrated in FIGS. 1–3.

FIG. 4 shows schematically a device by means of which the freezing process explained in connection with FIGS. 1–3 can be executed. In this apparatus, the perforated metallic belt 1 is disposed on two drums 8 and 9 and rotates in the direction of arrow 2. Underneath the belt, chambers 10 and 11 are formed which, with their sidewalls 10a and 11a, are in close contact with the underside of the upper run of the belt 1. A hood 12 serving as the freezing chamber, with a separate zone 12a, is arranged above the belt 1. With the aid of an air-conveying device 13, for example with the aid of a blower, a superatmospheric pressure is produced in the hood with respect to the chamber 11. The chamber 11 and the chamber 12 and, analogously, the zones 10 and 12a, are in communication by an air-conveying system 14, 14c and thus are disposed in a cycle system wherein a heat exchanger 15 is likewise arranged; the latter cools the air circulated in the cycle system 14 to the desired temperature. From the pressure side 14a of the cycle system 14, a further conduit 17 branches off via an adjustable throttle 16, which conduit leads to the chamber 10. Consequently, the pressure in the chamber 10 can be regulated. This pressure is adjusted to be lower than the pressure in the hood 12, so that the air jets 5 have a substantially lower velocity $W_1$ than the throughflow velocity $W_2$. The cold air penetrating from chamber 10 through the material to be frozen is subsequently returned into the cycle. In the hood 12, finally, air baffles and/or flow or ejector nozzles 18 can be provided, through which the cold air impinges with considerable speed on the layer 3 of the material to be frozen, passes through the flow channels 6 of the material, and through the openings 4 in the belt, and thus effects an intensive heat removal.

The mode of operation of the novel apparatus is as follows:

A layer 3 of the foods to be frozen is charged onto the belt 1 in the direction of arrow 2; by the travel of the belt, the foods pass into the zone above the chamber 10. The pressure in the chamber 10 is adjusted so that the layer 3 is aerated along the lines of the explanations regarding FIG. 3, and throughflow channels 6 are formed, because the cold air withdrawn from the pressure side 14a of the cycle 14 freezes the opened-up channels 6. During the further movement of the belt 1, the material now passes to the zone underneath the hood 12, where it is exposed to a throughflow of cold air from above at a considerable velocity and is thus intensively cooled until leaving the hood 12. The material can then be discharged from the belt 1 and can already be advantageously crushed or comminuted during this last step.

While I have shown and described a preferred embodiment in accordance with the present invention, it is understood that the same is not limited thereto but is susceptible of numerous changes and modifications as would be known to a person skilled in the art, given the disclosure of this application, and I therefore do not wish to be limited to the details shown and described herein but intend to cover all such changes and modifications as are within the scope of those skilled in the art.

In a practical embodiment in accordance with the present invention for freezing cabbage, parsley and leek, a metallic belt of approximately 1mm thickness having approximately 20 percent free passage formed by approximately 4mm diameter holes spaced approximately 8mm from one another at angles of 60° to one another could be used. $W_1$ could be in the range of 0.1 to 0.5mps (meters/second) and $W_2$ could be in the range of approximately 2 to 6mps. These particular dimensions are given by way of non-limitative example only, in order to aid in an understanding of the present invention and are not intended to limit the scope of the appended claims.

I claim:

1. Process for freezing foodstuffs comprising the successive steps of:
   placing foodstuffs in a relatively flat layer on a support,
   applying a first flow of cooling medium against said flat layer at a plurality of spaced positions on the support and in a direction from said support toward said flat layer so as to form frozen channel portions through said flat layer at said spaced positions,
   and applying a second flow of cooling medium against said flat layer in a direction toward said support so as to freeze the remainder of said layer.

2. Process according to claim 1, wherein said applying of said first and second flows includes providing higher velocity for said second flow than for said first flow.

3. Process according to claim 1, wherein said support is constructed as a belt member having through openings at said spaced positions, and wherein said applying of said first flow includes forming a pressure differential across said belt member such that the first flow of cooling medium passes through said openings and then against said flat layer to form said frozen channel portions.

4. Process according to claim 3, wherein said applying of said second flow includes forming a pressure differential across said belt member such that the second flow of cooling medium passes through said openings after passing through said flat layer and associated frozen channels.

5. Process according to claim 4, wherein said applying of said first and second flows includes moving said belt member through serially arranged freezing chambers which have oppositely directed freezing medium flows therein.

6. Process according to claim 5, wherein said foodstuffs include foodstuffs of especially pulpy consistency such as sliced and boiled fruits and vegetables, wherein said applying of said first and second flows includes providing a higher velocity and colder cooling medium for said second flow than for said first flow, and wherein said cooling medium is cooled air.

7. Process according to claim 6, wherein said moving of said belt member includes arranging said belt member as an endless belt extendiing around two roller members arranged at opposite ends of said freezing chambers.

8. Process for freezing foodstuffs comprising the successive steps of:
   placing foodstuffs in a relatively flat layer on a support,
   applying a first flow of cooling medium against said flat layer at a plurality of spaced positions on the support and in a direction from said support toward said flat layer so as to form frozen channels through said flat layer at said spaced positions,
   and applying a second flow of cooling medium against said flat layer in a direction toward said support,
   wherein said support is constructed as a belt member having through openings at said spaced positions, and wherein said applying of said first flow includes forming a pressure differential across said belt member such that the first flow of cooling medium passes through said openings and then against said flat layer to form said frozen channels,
   wherein said applying of said second flow includes forming a pressure differential across said belt member such that the second flow of cooling medium passes through said openings after passing through said flat layer and associated frozen channels,
   wherein said foodstuffs include foodstuffs of especially pulpy consistency such as sliced and boiled fruits and vegetables, wherein said applying of said first and second flows includes providing a higher velocity and colder cooling medium for said second flow than for said first flow, and wherein said cooling medium is cooled air.

9. Process for freezing foodstuffs comprising the successive steps of:
   placing foodstuffs in a substantially flat, substantially continuous layer on a support,
   applying a first flow of cooling medium against said layer at a plurality of spaced positions on the support and in a direction from said support toward said flat layer and at such a flow velocity and temperature to form frozen channel portions through said flat layer at said spaced positions,
   and applying a second flow of cooling medium against said layer in a direction toward said support and at such a flow velocity and temperature to freeze the remainder of said layer.

10. Process for freezing foodstuffs comprising the successive steps of:
    placing foodstuffs in a relatively flat layer on a support,
    applying a first flow of cooling medium at a first flow velocity against said flat layer at a plurality of spaced positions on the support and in a direction from said support toward said flat layer so as to form frozen channels through said flat layer at said spaced positions,
    and applying a second flow of cooling medium at a second flow velocity against said flat layer in a direction toward said support, wherein said second flow velocity is substantially higher than said first.

11. Process according to claim 10, wherein said applying of said first and second flows includes providing a colder cooling medium for said second flow than for said first flow.

12. Process for freezing foodstuffs comprising the successive steps of:

placing foodstuffs in a substantially flat layer on a substantially horizontal support, which layer is of the type which would exert such a resistance against the through flow of a medium from above that it would be extremely difficult for the medium to flow through the layer and through the support which has a plurality of spaced openings extending therethrough, applying a first air jet flow of cooling medium at a temperature below the freezing temperature of the layer against said layer at said spaced openings in the support in a direction to urge upwardly portions of the layer disposed above the openings such that frozen through flow channels are formed in the layer, and applying a second flow of cooling medium at a temperature below the temperature of the first flow of cooling medium against said layer in a direction toward said support so as to intensively freeze the remainder of the layer.

* * * * *